(12) United States Patent
Wang

(10) Patent No.: US 7,352,879 B2
(45) Date of Patent: Apr. 1, 2008

(54) CONJUGATE CLUSTER SCREENS FOR EMBEDDING DIGITAL WATERMARKS INTO PRINTED HALFTONE DOCUMENTS

(75) Inventor: Shen-ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 489 days.

(21) Appl. No.: 11/006,198

(22) Filed: Dec. 6, 2004

(65) Prior Publication Data

US 2006/0120557 A1 Jun. 8, 2006

(51) Int. Cl.
*H04K 1/00* (2006.01)

(52) U.S. Cl. ...................... 382/100; 358/3.28

(58) Field of Classification Search ............... 382/100, 382/232; 358/3.28; 713/176; 380/51, 54, 380/55

See application file for complete search history.

(56) References Cited

U.S. PATENT DOCUMENTS

| | | | | |
|---|---|---|---|---|
| 5,469,267 | A | 11/1995 | Wang | 358/298 |
| 5,734,752 | A | 3/1998 | Knox | 382/212 |
| 5,790,703 | A | 8/1998 | Wang | 382/212 |
| 6,263,086 | B1 | 7/2001 | Wang | 382/100 |
| 6,678,390 | B1 | 1/2004 | Honsinger | 382/100 |
| 6,694,041 | B1 | 2/2004 | Brunk | 382/100 |
| 6,751,335 | B1 | 6/2004 | Honsinger | 382/100 |
| 6,775,394 | B2 | 8/2004 | Yu | 382/100 |
| 6,826,289 | B1 | 11/2004 | Hashimoto | 382/100 |
| 2002/0102007 | A1* | 8/2002 | Wang | 382/100 |
| 2004/0258272 | A1* | 12/2004 | Fan | 382/100 |

OTHER PUBLICATIONS

Fu et al., "Self-conjugate watermarking technique for halftone images," IEE Electronics Letters, vol. 39, No. 4, Feb. 20, 2003, pp. 356-358.*

Fu et al., "A Novel Method to Embed Watermark in Different Halftone Images: Data Hiding by Conjugate Error Diffusion (DHCED)," IEEE Proc. Int. Conf. on Acoustics, Speech, and Signal Processing, vol. III, Apr. 2003, pp. 529-532.*

Fan, "Information Embedding Using Two-Layer Conjugate Screening," Proc. SPIE vol. 5310: Optical Security and Counterfeit Deterrence Techniques V, Jan. 2004, pp. 170-175.*

M.U. Celik, et al., "Universal Image Steganalysis using Rate Distortion Curves", Proc. SPIE: Security, Steganography, and Watermarking of Multimedia Contents VI, vol. 5306, San Jose Jan. 19-22, 2004, pp. 670-684.

Zachi Baharav, et al., "Watermarking of Dither Halftone Images", HP Laboratories, Israel, HPL-98-32, May 1999.

Document Center 236/286, Fuji Xerox, Brochure.

Sharma et al., "Show-through Watermarking of Duplex Printed Documents," Proc. SPIE vol. 5306: Security, Steganography and Watermarking of Multimedia Contents IV, Jan. 2004, pp. 467-476.

* cited by examiner

*Primary Examiner*—Andrew W. Johns
(74) *Attorney, Agent, or Firm*—Kermit D. Lopez; Luis M. Ortiz; Ortiz & Lopez, PLLC

(57) ABSTRACT

Methods and systems for utilizing conjugate cluster halftone screens to embed patterns or images as invisible watermarks into both digital halftone image files and corresponding printed documents are disclosed. In general, two or more two-conjugate halftone screens can be configured to provide a basic information carrier for embedding a digital watermark into a document. Thereafter, one or more clusters can be created from the two-conjugate halftone screens, wherein such clusters include the same centroid position relative to a grid defined by fundamental halftone frequencies. Two halftone patterns can then be blended from the two-conjugate halftone screens in a cluster-to-cluster basis so that virtually no loss of image quality occurs in comparison with an output of either the two-conjugate halftone screens, thereby permitting the digital watermark to be embedded into the document utilizing the two-conjugate halftone screens.

20 Claims, 8 Drawing Sheets

CONJUGATE CLUSTER SCREENS FOR EMBEDDING DIGITAL WATERMARKS INTO PRINTED HALFTONE DOCUMENTS

TECHNICAL FIELD

Embodiments are generally related to data-processing methods and systems. Embodiments are also related to rendering devices, such as printers, scanners, multi-function devices, photocopy machines, and the like. Embodiments are also related to methods and systems for rendering digital watermarks on documents.

BACKGROUND OF THE INVENTION

Watermarks have long been used in the printing industry to identify the source or origin of a document. Generally, a watermark appears as a faint pattern in an image, which is visible only when the original document is viewed in a particular manner. Unless a copyist had access to the watermarked paper, it would be difficult for him to reproduce the document without showing its unauthenticity. That is to say, without the paper on which the original image was originally printed, the copy should be readily detectable. However, as people move away from the use of watermarked papers for cost and other practical reasons, it is still necessary to identify the source or origin of a document image.

The introduction of the plain paper copier has resulted in a proliferation of paper copies of paper originals. A similar result is happening to electronic images, given the easy availability of digital scanners and a quick and widespread access to images throughout the Internet. It is now very difficult for the creator of an image to generate an electronic original, for which he can be assured that illegal copies will not be spread to third parties. The use of a digital watermark is a technology that aims to prevent that spread, by incorporating an identifying mark within the image that allows one to identify the source of the image in an electronic copy. It is important that the identifying mark not be disturbing or distracting to the original content of the image, while at the same time, allowing an easy identification of the source. The watermarks could be added either by the scanner or by the halftoning software.

Watermark identification may be accomplished by embedding a digital watermark in a digital or printed page that will identify the owner of rights to the image. In the past, these images have been produced and delivered in hard copy. In the future, these images will be distributed mainly in digital form. Therefore, image identification will have to work for both hard copy and digital image forms.

Watermarking can take two basic forms, visible or perceptible and invisible or imperceptible. Visible watermarks are marks such as copyright logos or symbols or logos that are imprinted into the digital or printed image to be distributed. The presence of the watermark is made clearly visible in the image in a way that makes it difficult to remove without damaging the image. The presence of the visible watermark does not harm the usefulness of the image, but it prevents the image from being used without permission. However, visible watermarks may interfere with the use of the image or with the image aesthetics. The visible watermark is also a potential target for fraud, in that it is possible for a fraudulent copier of the image to identify the location of the watermark and attempt to reproduce the image without the watermark.

Invisible watermarks are marks such as copyright symbols, logos, serial numbers, etc. that are embedded into digital or printed images in a way which is not easily discernible to the unaided eye. At a later time, the information embedded in these watermarks can be derived from the images to aid identification of the source of the image, including the owner and the individual to whom the image is sold. Such watermarks are useful for establishing ownership when ownership of an image is in dispute. They will be less likely to be useful as a deterrent to the theft of the image. While either or both visible or invisible watermarks are desirable in an image, they represent different techniques for either preventing copying or detecting copying.

Several conventional techniques for rendering and/or retrieving digital watermarks have been proposed or implemented. For example, a correlation-based stochastic screening methodology for embedding the retrieving invisible watermarks in printed documents has been proposed. In such conventional approaches, a well-designed stochastic screen that appears similar to a pattern with some evenly distributed dots can generate the halftone output. By varying the density of the black (or white) dots, different gray levels may be simulated, even though the halftone output is essentially only black-and-white. Certainly, there are many possible different "random" distributions, which can function equally as the visual effect of half-toning is concerned.

FIG. 1 illustrates a group of conventional halftone patterns for illustrative purposes. For example, in FIG. 1 three halftone patterns 102, 104, 106, respectively labeled as (A), (B), and (C) are depicted, which show little difference unless they are compared closely. A quick comparison of two dot distributions can be conducted by the overlay one pattern on another as indicated in FIG. 1. The overlay of the distribution (A) on (B) shows that there is no difference between the two distributions as indicated by pattern 108, while the overlay of (A) on (C) yields a quite different result as indicated by pattern 110.

In other words, it can be concluded that the distributions of (A) and (B) are highly correlated (i.e., they are identical in this particular case), while (A) and (C) are much less correlated, or almost uncorrelated. Mathematically, the overlaying comparison of two digital binary images is equivalent to a pixel-wise AND operation. It is not difficult to see that a XOR (i.e., exclusive "or") logical operation may provider a stronger visual difference, considering that the XOR result of (A) and (B) as indicated by pattern 112 (i.e., two identical binary patterns) is merely a pattern with a uniform value one. The pattern 114 is based on a XOR result of (A) and (C), which is visually much stronger than that of pattern 112.

FIG. 2 illustrates the basic concept of embedding watermark into a halftone image. Consider a halftone pattern (D) composed of two partitions: part one is cut off from the distribution (B) depicted in FIG. 1 and part two is from the distribution (C) also depicted in FIG. 1. Thus, the first partition of (D) is represented by pattern 202, while the second partition of (D) is represented by pattern 204. Therefore, overlay of the distribution (A) as indicated by pattern 206 on the composed pattern (D) as indicated by pattern 208 shows a strong contrast between the correlated partition and the uncorrelated one.

With a simple cut-and-paste process, however, the watermark might be visible through the "seam" between two partitions, as shown below by careful examining the pattern (D) (i.e. pattern 208). A logical AND combination of (A) and (D) results in pattern 210, while a logical XOR of (A) and (D) results in pattern 212. While such kind of "visible" watermarks might be acceptable for some applications, invisible watermarks are certainly more desirable for security and many other purposes including maintaining high image quality.

It was previously proposed to make the watermark truly invisible by "smearing out the seam" using a special screen design process. An invisible watermark, such as a letter or a simple binary pattern, can be embedded into a stochastic screen, which can be utilized as a normal halftone screen, and no further watermark embedding is needed during halftoning and printing. The drawback of this approach is that the watermark pattern is fixed and limited to relatively a small size and simple shapes due to the constraints of the current design processes for stochastic screens. A method for utilizing two correlated stochastic screens to embed variable data into images at the run time has also been proposed.

Thus, such conventional correlation-based stochastic screening methods can provide a practical approach to embed watermarks in documents for both their digital formats and printed hardcopies. Stochastic screening, the single-pixel-based halftone method, however, is mainly utilized for inkjet printers and is practically unsuitable to xerographic printers. For most printing products, to embed digital watermarks into a halftone image at a high resolution and a high quality, a methodology based on manipulating ordered cluster screens is required. Such a methodology, including related systems and devices, has to date not been designed or implemented.

There are also many other digital watermark methods proposed for electronic and printed images. Most approaches for embedding watermarks into halftone images, however, are based on manipulating individual pixels, such as by design of special stochastic screens or by modifying error diffusion halftone methods. In some the same manner, the glyph method applied to halftone images also falls into this category.

Due to the nature of xerographic printing, however, that is the technique for the majority of printing products, single-pixel-based halftoning methods, including stochastic screening and error diffusion, have limited applications. Instead, ordered cluster halftone screens are still the only choice of halftone implementation equipped or supported by most printers. Many existing digital watermark methods work well on digital formats of images but fail badly in detection of embedded watermark information from hardcopies, unless the images are printed in much lower resolutions or the embedded information is reduced to fit in much smaller capacities. There is a strong demand for digital watermark methodologies and systems, which can embed information into printed documents using ordered halftone screens.

BRIEF SUMMARY

It is a feature of the embodiments to provide improved data-processing methods and systems.

It is also a feature of the embodiments to provide improved data-processing methods and systems for rendering devices, such as printers, scanners, multi-function devices, photocopy machines, and the like.

It is also a feature of the embodiments to provide methods and systems for rendering digital watermarks on documents.

It an additional feature of the embodiments to provide conjugate cluster screens for embedding digital watermarks into printed halftone documents.

Aspects of the present invention relate to methods and systems for utilizing conjugate cluster halftone screens to embed patterns or images as invisible watermarks into both digital halftone image files and corresponding printed documents. The embedded watermarks can be retrieved later from the file or the printed hardcopy and become visible. Two conjugate halftone screens can produce two similar ordered cluster halftone patterns, which have exactly same halftone frequencies, in terms of amplitude, angle and phase, and provide an exactly same color appearance. The two-status clusters provide the basic information carrier for embedding digital watermarks. Furthermore, all clusters created by the conjugate screens have a same centroid position relative to a grid defined by the fundamental halftone frequencies.

Therefore, two halftone patterns by the conjugate screens can be arbitrarily "mixed", or "blended", in a cluster-to-cluster basis with virtually no loss of the image quality in comparison with the output by either one of the two screens. Moreover, the blending of conjugate clusters can be stochastically arranged to further reduce any possible visual notice. Variable data can be encoded at the run time as watermark patterns with a resolution corresponding to individual clusters. The embedded watermark information can be seen only when the marked image is compared with a corresponding reference image, or a key image, in a cluster-to-cluster basis.

BRIEF DESCRIPTION OF THE DRAWINGS

The particular values and configurations discussed in these non-limiting examples can be varied and are cited merely to illustrate one or more embodiments and are not intended to limit the scope thereof.

DETAILED DESCRIPTION OF THE INVENTION

The particular values and configurations discussed in these non-limiting examples can be varied and are cited merely to illustrate embodiments and are not intended to limit the scope of the invention.

The embodiments disclosed herein provide a new approach for embedding invisible watermarks into documents utilizing conjugate cluster halftone screens. The main achievement of such an approach is that it maintains all important image quality requirements for high-end color printing, while adding the function of embedding invisible watermarks into printed halftone images. As described in greater detail herein, halftone image with embedded with watermarks according to the disclosed embodiments can provide the perceptually same image quality as the watermarks embedded by a normal halftone process utilizing four rotated cluster halftone screens with matched frequencies to satisfy a moiré-free condition.

Figure 3:
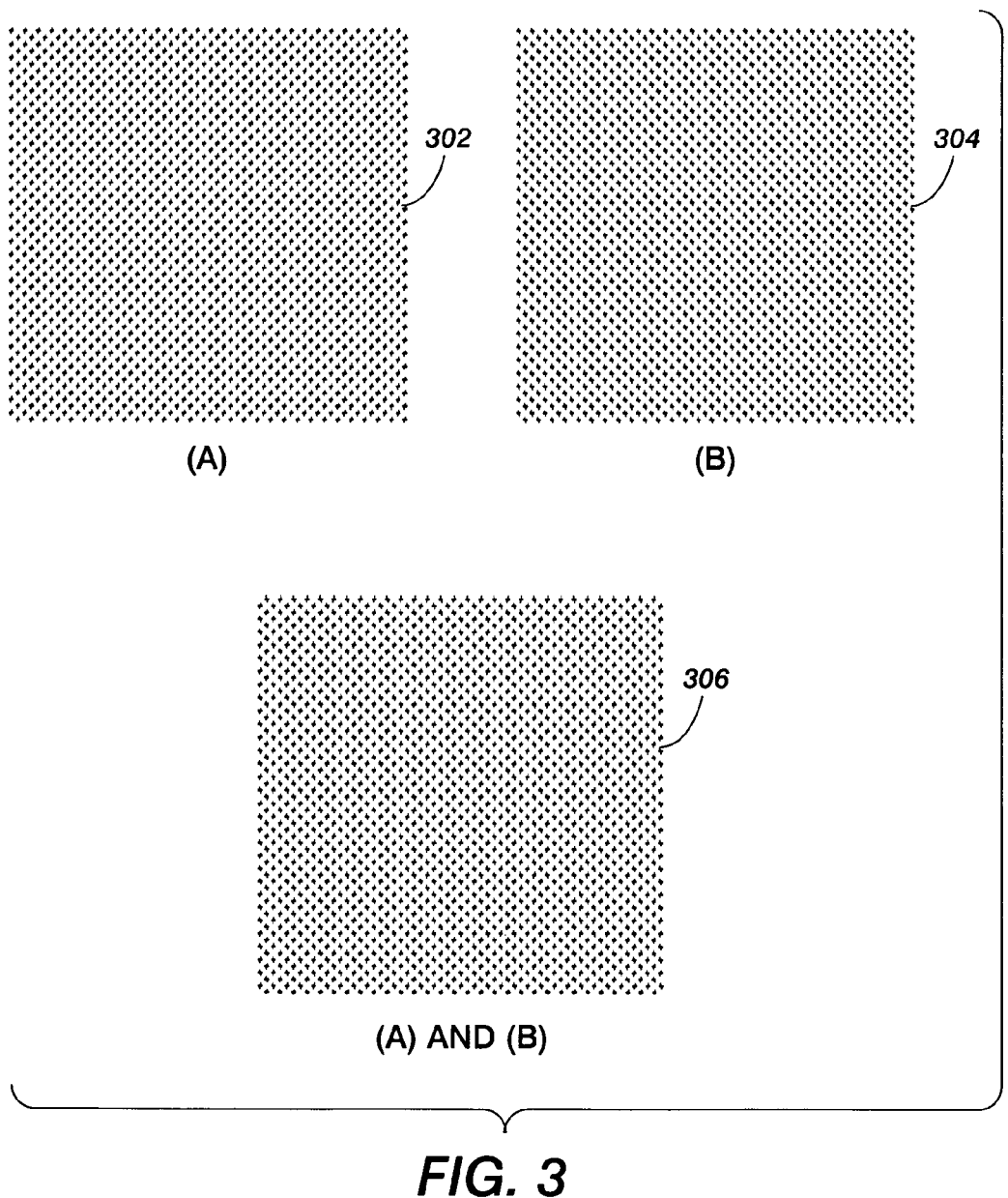
FIG. 3 illustrates a group of halftone patterns, in accordance with a preferred embodiment.

FIG. 3 illustrates a group of halftone patterns 302, 304, and 306, in accordance with a preferred embodiment. Halftone pattern 302 can be labeled (A), while halftone pattern (304) is generally labeled (B). In general, it is well known that a normal visual acuity of human eyes is about 1 minute, or about 100 □m at a normal reading distance. The size of each pixel printed by a typical current printer, say, with a 600-DPI (dot-per-inch) resolution, is about 40□m×40□m. A halftone cluster produced by an ordered halftone screen with 45-degreerotation and 141-LPI (line-per-inch) spatial frequencies consists no more than 3×3 pixels, or is in a size smaller than 120□m×120□m. Therefore, human eyes cannot resolve the detail of each individual cluster under a normal viewing condition.

For example, FIG. 3 depicts two types of black clusters, (A) and (B), respectively patterns 302 and 304. It is not difficult to notice the difference between patterns 302 and 304 at the normal reading distance. Actually, the two kinds of clusters are mirror images of each other. If such patterns are printed as the outputs of a printer with a 141-LPI-halftone screen, however, the difference will not be so clear. In the example illustrated in FIG. 3, the two halftone patterns (A) and (B) are printed at a resolution of approximately 18-LPI. If one looks at these pictures while holding the page two-meter away, the visual effect is just about equivalent to a similar pattern printed in 141 LPI. Thus, at the two-meter reading distance, it is safe to conclude that no one can tell the difference between the two patterns 302 and 304, (A) and (B), easily, if not impossibly at all.

The third pattern 306 depicted in FIG. 3 appears probably the same as (A) and (B) at the two-meter distance. Of course, with a closer look, anyone can tell that it is a result of blending type (A) and (B) clusters together. As a matter of fact, this demonstrates the fundamental basis of embedding information to halftone images utilizing conjugate clustered halftone patterns: if one has two (or more) different types of clusters, which difference(s) can be detected by a scan-and-analyze process, but visually imperceptible, such configurations can be utilized as the watermark information carrier. Making the blending imperceptible, however, is not a trivial task. The following samples depicted in FIG. 4 and FIG. 5 can be utilized to explain the requirements for achieving a "perfect" blending.

Figure 4:
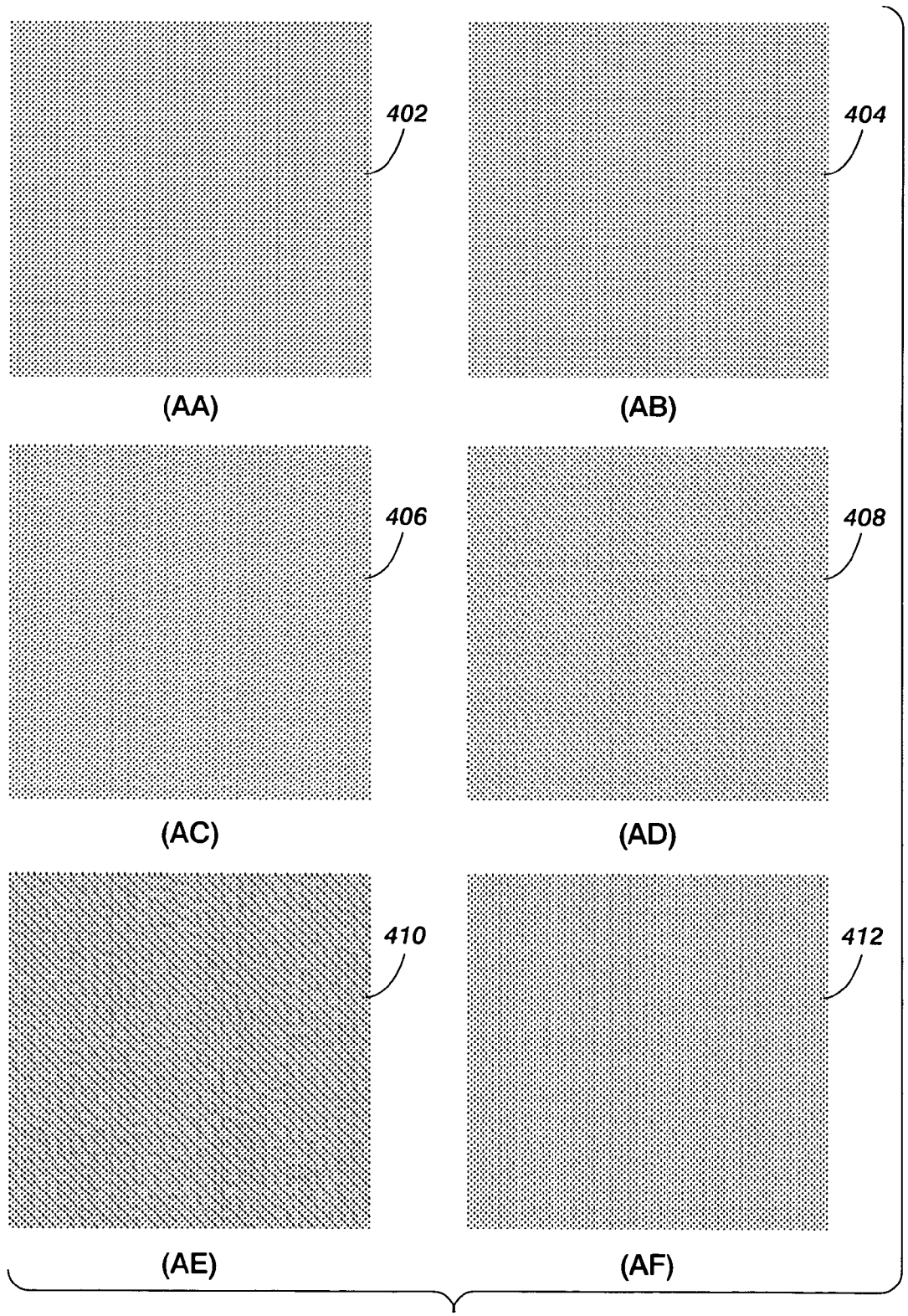
FIG. 4 illustrates a group of halftone patterns, in accordance with a preferred embodiment.
Figure 5:
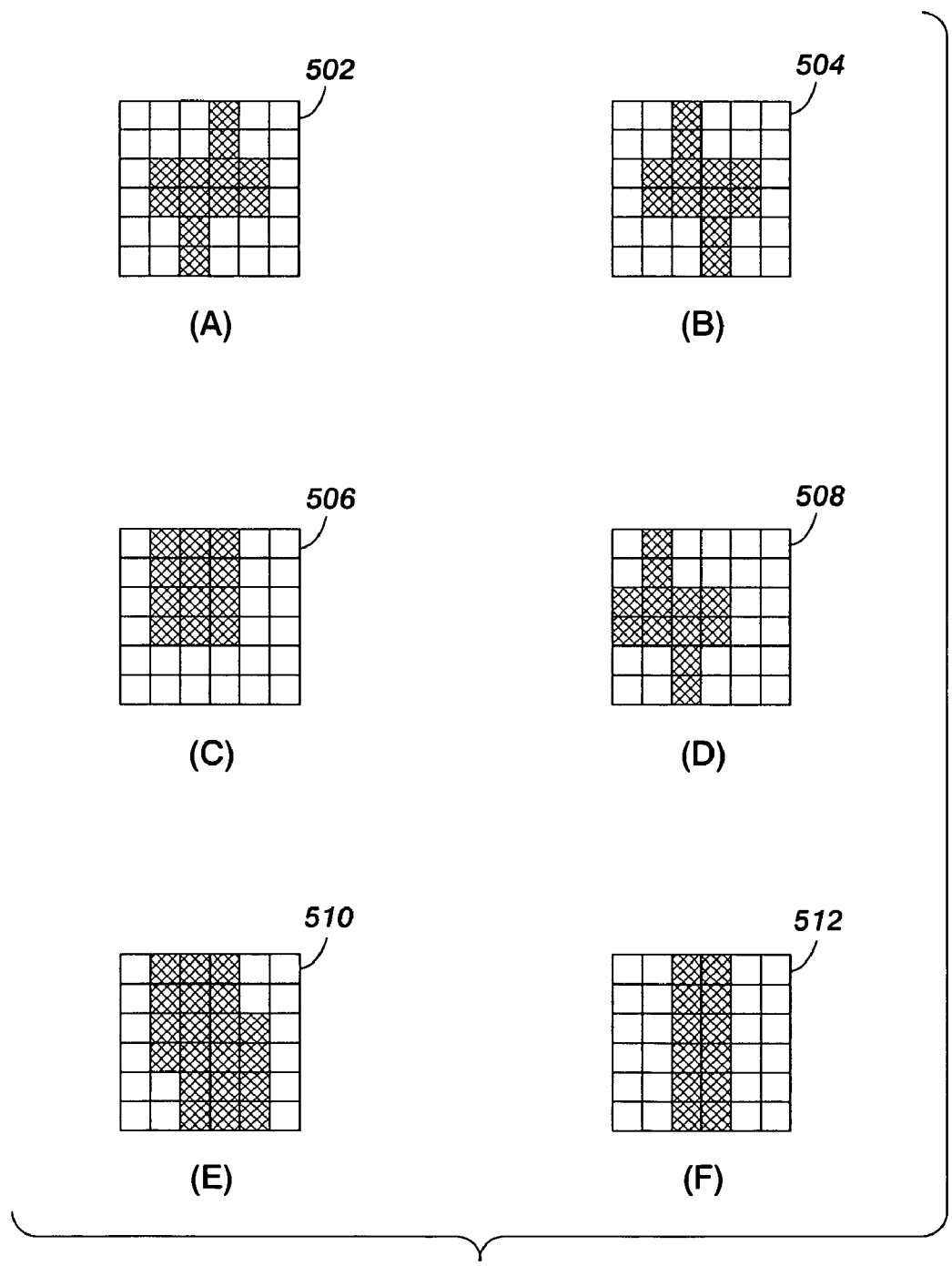
FIG. 5. illustrates a group of pixels, in accordance with a preferred embodiment.

FIG. 4 illustrates a group of halftone patterns, in accordance with a preferred embodiment. FIG. 5 illustrates a group of pixels, in accordance with a preferred embodiment. FIGS. 4-5 can be interpreted together to illustrate a watermark rendering application. In FIG. 4, pattern 402 is indicated as (AA), while pattern 404 is represented as an (AB) type-pattern. Additionally, pattern 406 is represented as an (AC) type, while pattern 408 is indicated as an (AD) type pattern. Also, pattern 410 is represented as an (AE) pattern, while pattern 412 is indicated as an (AF) pattern. In FIG. 4, the halftone patches of patterns 402 to 412 can be printed at a 36 LPI resolution. All such patches are composed of type (A) and one of the other types, except the first pattern 402, (M), which possesses only type (A) clusters.

In FIG. 5, six patterns of pixels are representing, including patterns 502, 504, 506, 508, 510 and 512. The shapes of different clusters and their positions relative to the halftone grid are generally indicated in FIG. 5. The type (A) pattern 502 generally possesses 12 black pixels, while the centroid of all blacks is located at the center of the grid. The type (B) of pattern 504 is a mirror image of the type (A) and also has a centroid at the center of the grid. The type (C) of pattern 506 contains 12 black pixels in a rectangular shape and the centroid is off the center of the grid in both x- and y-direction. The type (D) of pattern 508 has the same shape as the type (B) but with a centroid shifted one pixel to the left. The type (E) of pattern 510 contains a larger black area, with 20 pixels, and a centered centroid, while the type (F) pattern 510 has 12 pixels and also a centered centroid.

To achieve a "perfect" blending, or to avoid perceptible artifacts due to mixing different kinds of clusters, there are two requirements considered: First, two or more different types of clusters should have a same black area. (All examples shown here are for black clusters, although similar discussion could be applied to white "cluster", or gaps, as well.) The patch (AE) of pattern 410 depicted in FIG. 4 is therefore a blending of type (A) and (E) clusters with different black areas and demonstrates the "noise" due to the size mismatch. On the other hand, the patch (AB) of pattern 404 depicted in FIG. 4 is a perfect blending, because of the matched cluster size.

It is important to note that the shape and the area of a printed dot is usually quite different from the one defined by the idealized digital form. Printed single pixels are not perfect squares. Instead, they have irregular shapes and overlap one another. For example, although the type (A) and type (F) have a same area in their digital forms and their blending, the patch (AF) shows little noise in 36 LPI, their actual outputs from a real printer with a high resolution might show different sizes and their blending might be not perfect anymore. On the other hand, it is almost always true that the physical outputs of the type (A) and type (B) from any printer should match to each other due to the mirror symmetry, and the blending of patch (AB) of pattern 404 of FIG. 4 should be always "perfect".

Second, all clusters should be accurately aligned by the position of individual centroid, or the center of the mass. In fact, the second requirement is more vital than the first one. Psychophysical experiments have shown that human eyes have a much better acuity to align lines or dots, or sometimes called the vernier acuity, than the visual acuity to recognize small, fine details. Studies have demonstrated that the vernier acuity is 5 to 10 times the visual acuity. If the centroids of the clusters are not perfectly aligned, it will be easier to catch the noise, or artifact, by the eyes than the case due to size mismatch. This should explain why the blending of (A) and (D) yields a much worse result than the blending of (A) and (B), even if the type (B) and (D) have an exactly same shape and the shift of the centroid is only one pixel. It is also clear that the noise shown in the patch (AC) of pattern 406 is mainly due to the misalignment, not the shape difference.

Based on the study described above, an embodiment can be implemented for providing conjugate cluster screens that embedded watermark information into halftone images. First two conjugate cluster screens can carry exactly the same halftone frequencies, which can be defined by two frequency vectors. Besides the matched two vectors in both amplitude and angle, the two conjugate screens can also possess a matched initial phase, i.e., there is no shift between black or white clusters created by the two screens. Second, at any input level, two halftone patterns generated by the conjugate screens can be composed of ordered black or white clusters, depending on the appearance of the cluster, and all clusters have an exactly same area. Third, the centroid of each cluster can be defined as the center of the black or the white area. At any input level, the centroids of different clusters by the two conjugate screens can be located at an exactly same position relative to a grid defined by the fundamental frequencies of the halftone screens.

For images in a digital format, the numbers and the locations of black and white pixels can determine the area and the centroid of a cluster. For watermark applications to printed documents, however, the requirements described above have to be satisfied in circumstances of physical outputs of real printers. Due to various shapes of printed dots, dot overlapping and other printing effects, the area and the centroid of a cluster might be quite different from the calculation based on the digital format. Especially from most xerographic engines, the size, as well as the shape, of real clusters varies from time to time, from page to page, even from line to line, and can be only defined statistically.

In general, one or more conjugate screens can be provided as indicated herein. If the input signal has, for example, 256 different levels (i.e., as usual), every single screen may generate clusters with 256 different shapes due to input signal level. For each input level, two or more conjugate screens can generate two or more clusters in varying shapes (i.e., due to varying conjugate screens). Thus, two clusters described herein, due to different conjugate screens and the same input level, should have the same size and the same centroid position.

A suitable printer model may be required in the design of conjugate screens to estimate the area and the centroid position of real outputs. On the other hand, since the dot shape and the effect of dot overlapping are expected symmetric about both processing directions, at least in a sense of statistics, we may utilize these symmetry properties to design some conjugate cluster screens which satisfy the stated requirements above for both digital images and printed hardcopies.

Figure 6:
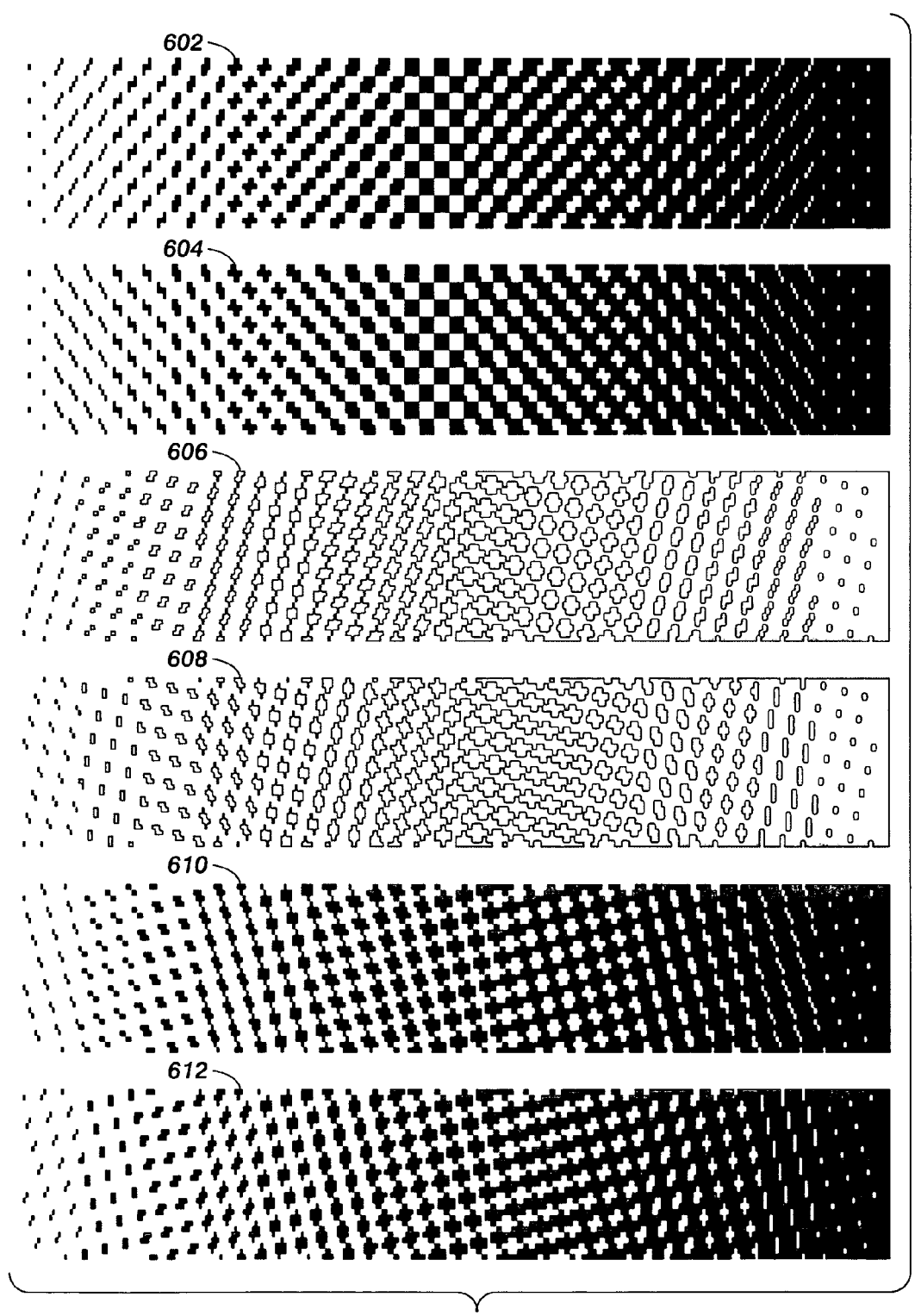
FIG. 6 illustrates three pairs of conjugate cluster screens with respect to six halftone outputs created correspondingly, in accordance with a preferred embodiment.

FIG. 6 illustrates three pairs of conjugate cluster screens with respect to six halftone outputs 602, 604, 606, 608, 610, 612 created correspondingly, in accordance with a preferred embodiment. In FIG. 6, each halftone image depicts a sweep with 17 different simulated gray levels. Such conjugate screens can be designed by modifying a set of non-orthogonal cluster screens used for a color printer. Because all halftone frequencies remain unchanged, the new design of conjugate screens can provide the same moiré-free color outputs as the original screen set while adding the embedding watermark function.

In general, the two conjugate halftone screens described herein can generate two different cluster patterns (also referred to simply as a "cluster") for each halftone level. The two clusters should have the same size and the same centroid position relative to the grid defined by the fundamental halftone frequencies. This condition should be met for all halftone signal levels. Thus, in the embodiment depicted in FIG. 6, different clusters at different levels are illustrated (i.e., approximately 20 levels in total).

Figure 7:
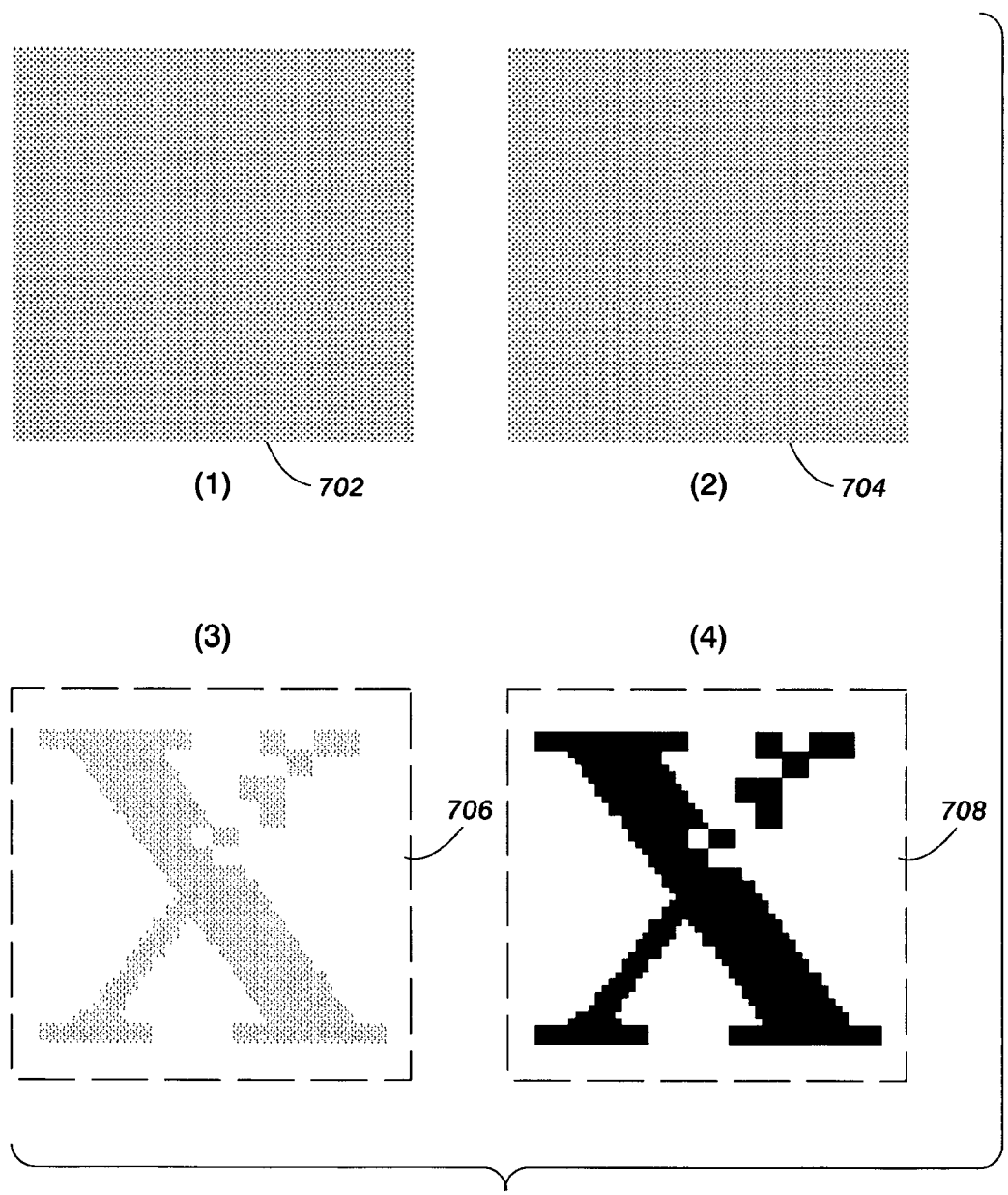
FIG. 7 illustrates a process for rendering a watermark truly invisible, in accordance with a preferred embodiment.

FIG. 7 illustrates a process for rendering a watermark truly invisible, in accordance with a preferred embodiment. In general, watermark information can be embedded into halftone images utilizing two conjugate cluster screens in a cluster-to-cluster basis. In other words, each cluster can function as a binary pixel for embedded watermarks, which can be implemented in the form of texts, patterns or any binary image. A direct embedding methodology, which alternates the two conjugate screens from cluster to cluster based on a desired binary watermark pattern, can create a halftone image with the embedded watermark imperceptible at a normal reading distance but noticeable in aid of a magnifier. To permit the embedded watermark to be truly invisible, an indirect embedding methodology can be described with reference to the following example.

First, a reference halftone image, or the key image, such as the patch (1) of pattern 702 depicted in FIG. 7, can be created with a randomly, or stochastically, arranged blending of the two different clusters by the conjugate screens. Second, based on a desired binary watermark pattern, such as the logo (4) of pattern 708, all clusters of the halftone image (1) of pattern 702 within the area specified by the black region of the watermark (4) of pattern 708 can be replaced by their corresponding conjugate clusters. The result of embedding is shown by the halftone image (2) of pattern 704 depicted in FIG. 7.

Third, to retrieve the embedded watermark from the halftone image (2) of pattern 704, the key image (1) of pattern 702 can be utilized for a comparison with image (2) of pattern 704 and the absolute value of the difference is shown in black by the image (3) of pattern 708. Fourth, by integrating the differences within each cluster area defined by the halftone image, (1) or (2), and applying a threshold to the result, the embedded watermark information can be retrieved as the exactly same pattern (4) embedded.

As indicated previously, the two conjugate halftone screens described herein can generate two different cluster patterns for each halftone level. The two clusters should have the same size and the same centroid position relative to the grid defined by the fundamental halftone frequencies. This condition should be met for all halftone signal levels. Additionally, one or more mask functions can be defined in a resolution of the halftone frequencies and addressed with clusters for digital watermark patterns embedded in the documents. For example, see pattern (4) described above with respect to FIG. 7.

Figure 8:
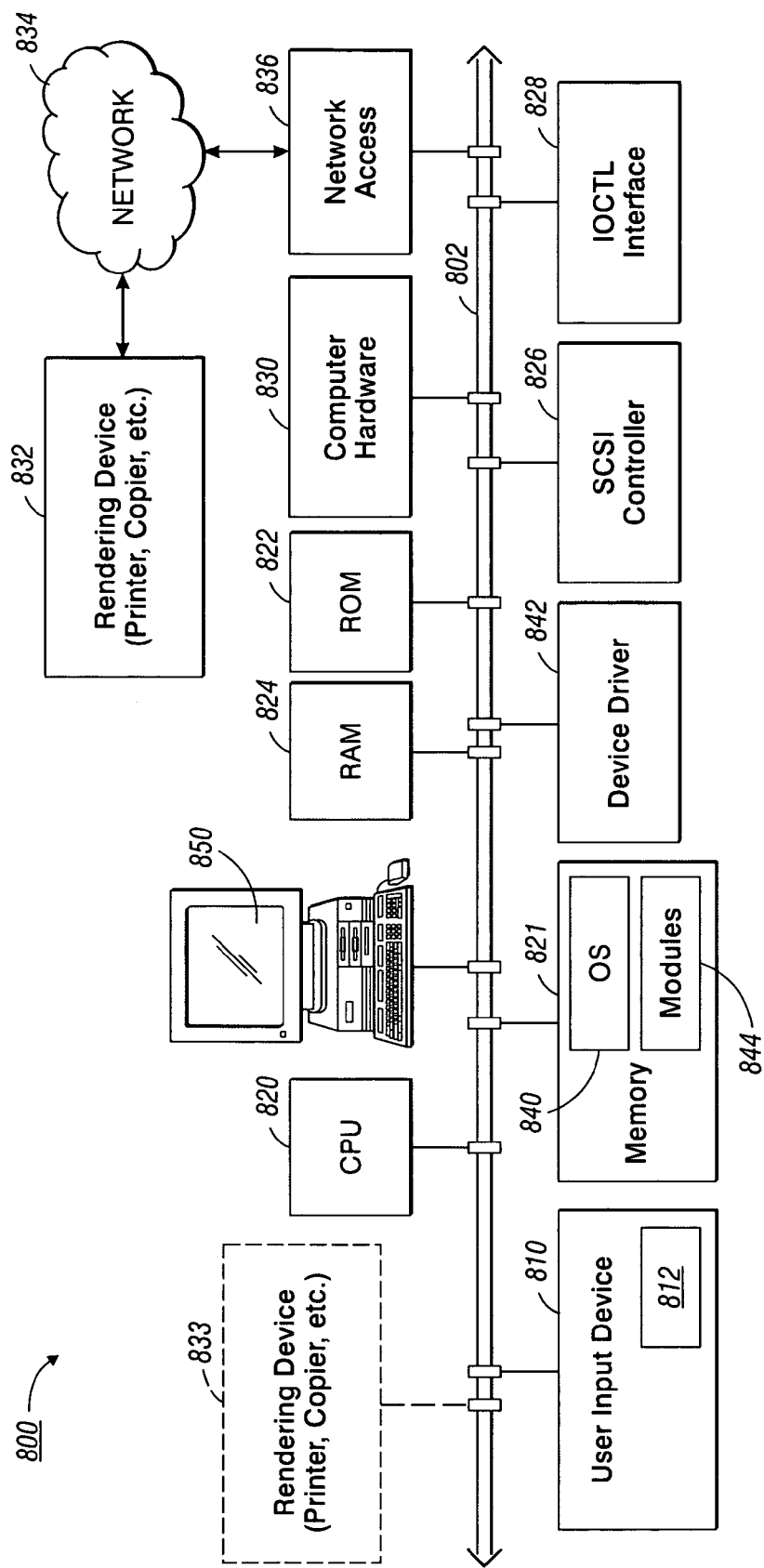
FIG. 8 illustrates a block diagram of a system in which a preferred embodiment of the present invention can be implemented.

For a further understanding of the present invention, reference is made to FIG. 8, which depicts a data-processing system 800 in which an embodiment of the present invention can be implemented. It can be appreciated that system 800 is described herein for general illustrative purposes only, and that the embodiments described herein can be implemented in the context of other types of data-processing systems, computers and networks thereof. Also, the elements and features of data-processing system 800 can be modified or changed based upon varying design considerations, so long as the general embodiments disclosed herein are practiced.

Figure 1:
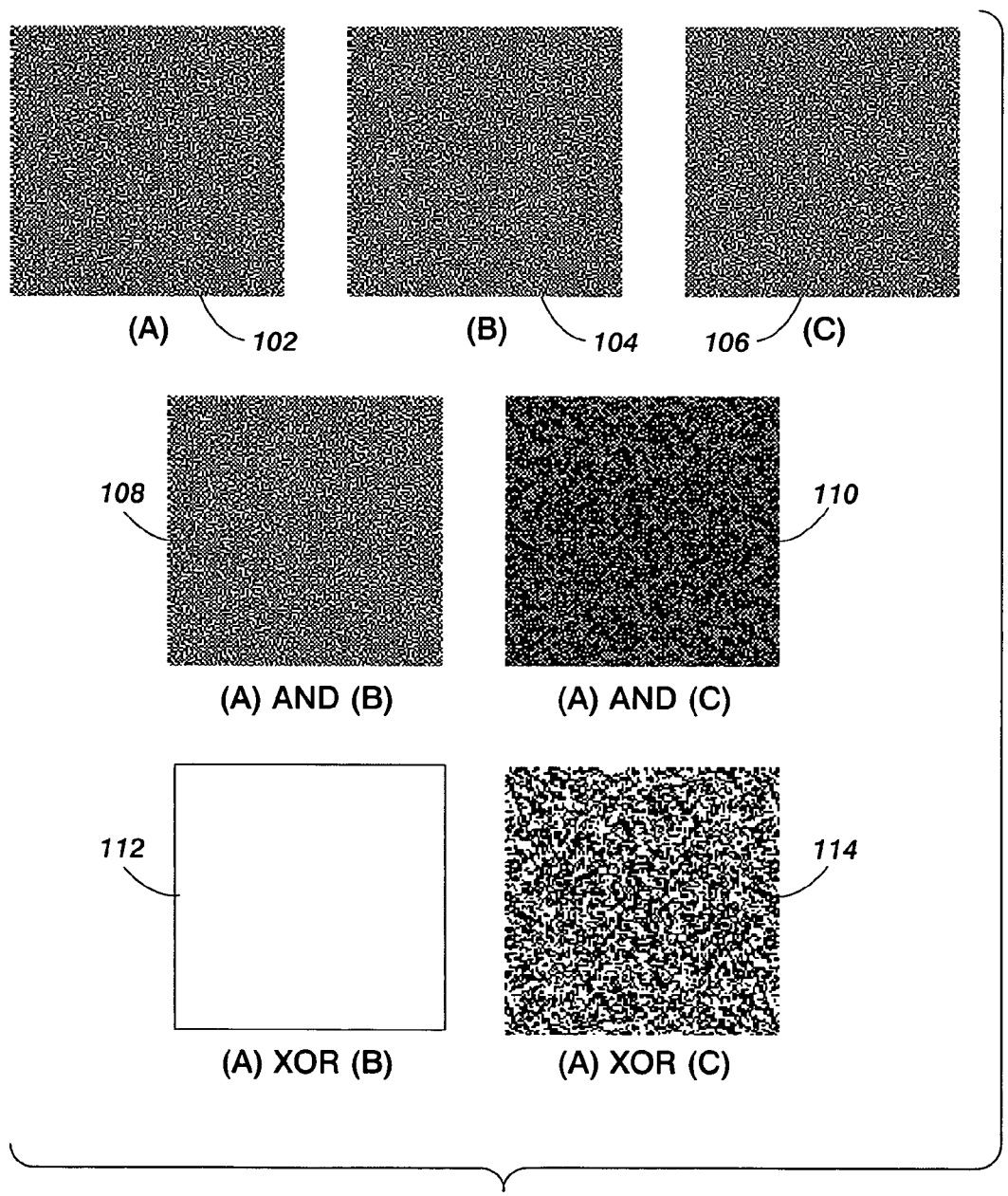
FIG. 1 illustrates a group of conventional halftone patterns for illustrative purposes.
Figure 2:
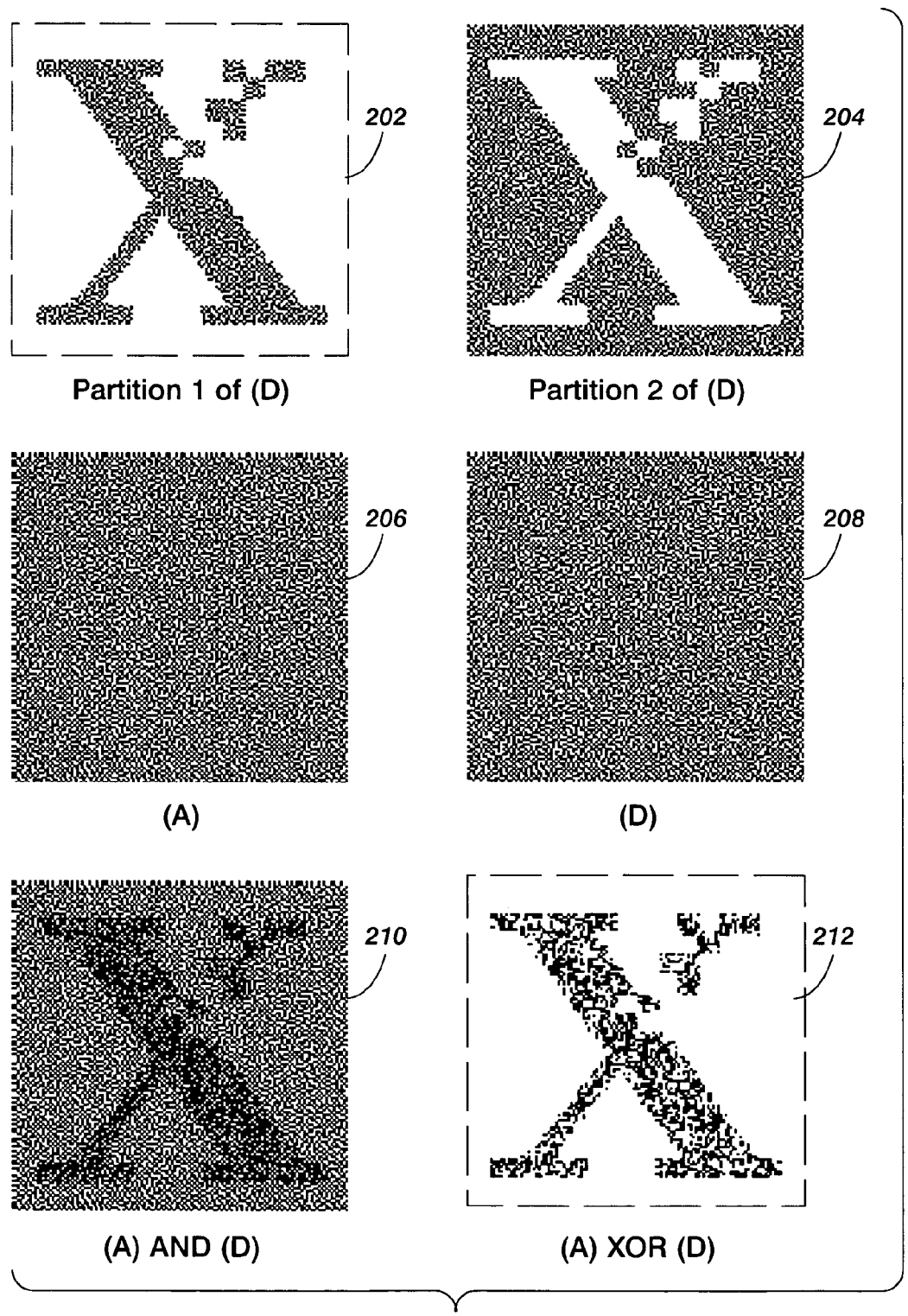
FIG. 2 illustrates the basic concept of embedding watermark into a halftone image.

Data processing system 800 of FIG. 1 thus generally includes a user input device 810, a central processing unit (CPU) 820, computer hardware 830, and a monitor 850. The user input device 810 can be coupled to the central processing unit 820 wherein the central processing unit 820 is coupled to the computer hardware 830 and the operating system 840. User input device 810 can be implemented, for example, as a computer keyboard, a computer mouse, and so forth.

The central processing unit 820 can be connected to a bus 802, which in turn can be connected to other system components, such as memory 821, Random Access Memory (RAM) 124, Read Only Memory (ROM) 824, a Small Computer Systems Interface (SCSI) controller 826, and an input/output control (IOCTL) interface 828. System bus 802 can also be connected to monitor 850, device driver 842 and user input device 810. The IOCTL interface is generally associated with operating system 840. Note that device driver 842 can be implemented as an SCSI device driver, depending upon design considerations. Memory 821, which is coupled to bus 802, can communicate with the central processing unit 820 via bus 802. Operating system (OS) 840 can be stored as a module or series of software modules within memory 821 and processed via CPU 120. Note the term "module" is defied in greater detail herein.

The operating system 840 is the master control program that runs the computer. It sets the standards for all application programs that run in the computer. Operating system 840 can be implemented as the software that controls the allocation and usage of hardware resources, such as memory 821, central processing unit 820, disk space, and other peripheral devices, such as monitor 850, user input device 810 and computer hardware 830. Examples of operating systems, which may be utilized to implement operating system 840 of system 800, include Windows, Mac, OS, UNIX and Linux.

Bus 802 can be implemented as a plurality of conducting hardware lines for data transfer among the various system components to which bus 802 is attached. Bus 802 functions as a shared resource that connects varying portions of data-processing system 800, including the CPU 820 (i.e., a microprocessor), controllers, memory and input/output ports and so forth and enabling the transfer of information. Bus 802 can be configured into particular bus components for carrying particular types of information. For example, bus 802 can be implemented to include a group of conducting hardware lines for carrying memory addresses or memory locations where data items can be found, while another group of conducting hardware lines can be dedicated to carrying control signals, and the like.

The user input device 810 can includes a plurality of device descriptor files 812. The device descriptor files 812 contain information related to the user input device, e.g. what type of device it is, who made the device, etc. The device descriptor files 812 can also contain user-defined fields called report descriptors. Report descriptors are strings of information that the operating system 840 can read. Report descriptors can be implemented, for example, as for passing useful information about the user input device 810 to the operating system 840 and/or a device driver 842. Such report descriptors are unique for each type of user input device.

Additionally, system 800 can include a network access device 836, such as a modem or other communications access device for accessing a computer network 834, which is also in communication with a rendering device 832, such as, for example, a printer, copier, fax machine, multi-function device, and so forth. Documents with invisible embedded watermarks can be rendered via a rendering device 832. Bus 802 can optionally be connected or communicate with directly with a rendering device 833. Thus, documents with embedded watermarks, as described herein, can also be rendered via rendering device 832 and/or 833.

Note that embodiments of the present invention can be implemented in the context of modules. Such modules may constitute hardware modules, such as, for example, electronic components of a computer system. Such modules may also constitute software modules. In the computer programming arts, a software module can be typically implemented as a collection of routines and data structures that performs particular tasks or implements a particular abstract data type.

Software modules generally are composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

The methodology described herein can therefore be implemented in the context of one or more such modules. Such modules can be referred to also as "instruction modules" and may be stored within a memory of a data-processing system such as memory 821 of FIG. 8. Modules 844 depicted in FIG. 8 represent such instruction modules. Such instruction modules may be implemented in the context of a resulting program product, which can be implemented as instruction media, including signal-bearing media such as recordable media and transmission media.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The embodiments of the invention in which an exclusive property or right is claimed are defined as follows. Having thus described the invention what is claimed is:

1. A method, comprising:
configuring at least two conjugate halftone screens having respective halftone signal levels thereof to provide a basic information carrier for embedding a digital watermark into a document;
automatically generating from said at least two conjugate halftone screens for each respective halftone signal level at least two clusters of varying shape due to differences among said at least two conjugate halftone screens, such that thereafter at each of all halftone signal levels thereof, said at least two clusters, due to varying conjugate screens among said at least two conjugate screens, comprise a same cluster size and a same centroid position relative to a grid defined by fundamental halftone frequencies; and
arbitrarily blending two halftone patterns from said at least two-conjugate halftone screens in a cluster-to-cluster basis so that virtually no loss of image quality occurs in comparison with an output of either one of said at least two-conjugate halftone screens, thereby permitting said digital watermark to be embedded into said document utilizing said at least two-conjugate halftone screens.

2. The method of claim 1 wherein said at least two clusters comprise different cluster patterns for each of all halftone signal levels.

3. The method of claim 1 further comprising:
stochastically arranging said arbitrarily blending of said two-conjugate halftone screens to further reduce a visualization of said digital watermark embedded in said document.

4. The method of claim 1 further comprising the steps of:
configuring said at least two clusters as a watermark mask that operates according to a resolution of said fundamental halftone frequencies; and
addressing said watermark mask with said at least two clusters in order to embed said digital watermark in said document.

5. The method of claim 4 wherein said digital watermark embedded in said document comprises text.

6. The method of claim 4 wherein said digital watermark embedded in said document comprises a pattern.

7. The method of claim 4 wherein said digital watermark embedded in said document comprises a binary image.

8. The method of claim 1 further comprising:
encoding variable data at run time as a plurality of watermark pattern associated with said digital watermark with a resolution of said fundamental halftone frequencies.

9. The method of claim 1 further comprising:
permitting viewing of embedded watermark information associated with said digital watermark embedded within said document when a marked image on said document is compared with a corresponding reference image in a cluster-to-cluster basis.

10. The method of claim 1 further comprising:
permitting viewing of embedded watermark information associated with said digital watermark embedded within said document when a marked image on said document is compared with a corresponding key image in a cluster-to-cluster basis.

11. The method of claim 1 wherein said arbitrarily blending two halftone patterns from said at least two-conjugate halftone screens in a cluster-to-cluster basis so that virtually no loss of image quality occurs in comparison with an output of either one of said at least two-conjugate halftone screens, further comprises:
comparing a shape difference between a marked image and a reference image or a key image in a cluster-to-cluster basis to produce a result thereof; and
applying a threshold to said result to thereby retrieve embedded watermark information associated with said digital watermark embedded in said document.

12. A method, comprising:
configuring at least two-conjugate halftone screens having respective halftone signal levels thereof to provide a basic information carrier for embedding a digital watermark into a document, wherein for each respective halftone signal level, said at least two conjugate halftone screens generate at least two clusters of varying shape due to differences among said at least two-conjugate halftone screens;
thereafter creating at least one cluster from said at least two-conjugate halftone screens, wherein said at least one cluster due to varying conjugate screens among said at least two-conjugate screens and a same halftone signal level thereof comprises a same size and a same centroid position relative to a grid defined by fundamental halftone frequencies for all halftone signal levels thereof, wherein said at least one cluster comprises two different cluster patterns for each halftone level of each respective halftone level;
arbitrarily blending two halftone patterns from said at least two-conjugate halftone screens in a cluster-to-cluster basis so that virtually no loss of image quality occurs in comparison with an output of either one of said at least two-conjugate halftone screens, wherein said at least one cluster functions as a binary pixel for said digital watermark embedded in said document;
stochastically arranging said arbitrarily blending of said two-conjugate halftone screens to further reduce a visualization of said digital watermark embedded in said document; and
thereby permitting said digital watermark to be embedded into said document utilizing said at least two-conjugate halftone screens.

13. A system, comprising:
an instruction module residing in a memory of a data-processing system for configuring at least two-conjugate halftone screens having respective halftone signal levels thereof to provide a basic information carrier for embedding a digital watermark into a document, wherein for each respective halftone signal level, said at least two conjugate halftone screens generate at least two clusters of varying shape due to differences among said at least two-conjugate halftone screens;
an instruction module residing in a memory of a data-processing system for thereafter creating at least one cluster from said at least two-conjugate halftone screens, wherein said at least one cluster due to varying conjugate screens among said at least two-conjugate screens and a same halftone signal level thereof comprises a same size and a same centroid position relative to a grid defined by fundamental halftone frequencies for all halftone signal levels thereof, wherein said at least one cluster comprises two different cluster patterns for each halftone level of each respective halftone level; and
an instruction module residing in a memory of a data-processing system for arbitrarily blending two halftone patterns from said at least two-conjugate halftone screens in a cluster-to-cluster basis so that virtually no loss of image quality occurs in comparison with an output of either one of said at least two-conjugate halftone screens, thereby permitting said digital watermark to be embedded into said document utilizing said at least two-conjugate halftone screens.

14. The system of claim 13 further comprising:
an instruction module residing in a memory of a data-processing system for stochastically arranging said arbitrarily blending of said two-conjugate halftone screens to further reduce a visualization of said digital watermark embedded in said document.

15. The system of claim 13 wherein said at least one cluster functions as a binary pixel for said digital watermark embedded in said document.

16. The system of claim 15 wherein said digital watermark embedded in said document comprises text.

17. The system of claim 15 wherein said digital watermark embedded in said document comprises a pattern.

18. The system of claim 15 wherein said digital watermark embedded in said document comprises a binary image.

19. The system of claim 13 further comprising:
an instruction module residing in a memory of a data-processing system for encoding variable data at run time as a plurality of watermark pattern associated with said digital watermark with a resolution corresponding to at least one individual clusters among said at least one cluster.

20. The system of claim 13 further comprising:
an instruction module residing in a memory of a data-processing system for permitting viewing of embedded water information associated with said digital image embedded within said document when a marked image on said document is compared with a corresponding reference image in a cluster-to-cluster basis; and
an instruction module residing in a memory of a data-processing system for permitting viewing of embedded water information associated with said digital image embedded within said document when a marked image on said document is compared with a corresponding key image in a cluster-to-cluster basis.

* * * * *